United States Patent
Liu et al.

(10) Patent No.: US 6,378,316 B2
(45) Date of Patent: Apr. 30, 2002

(54) METHOD FOR CHECKING THE STATE OF A CLOSED LOOP AIR-CONDITIONING SYSTEM COMPRISING A VARIABLE-THROUGHPUT COMPRESSOR

(75) Inventors: Jin Ming Liu, Conflans S/Honorine; Bruno Hamery, Paris, both of (FR)

(73) Assignee: Valeo Climatisation, La Verriere (FR)

( * ) Notice: Subject to any disclaimer, the term of this patent is extended or adjusted under 35 U.S.C. 154(b) by 0 days.

(21) Appl. No.: 09/736,399

(22) Filed: Dec. 15, 2000

(30) Foreign Application Priority Data

Dec. 17, 1999 (FR) .............................. 99 16008

(51) Int. Cl.⁷ .............................................. F25B 49/02
(52) U.S. Cl. .......................................... 62/129; 62/126
(58) Field of Search ................. 62/125, 126, 127, 62/129, 130, 208, 209

(56) References Cited

U.S. PATENT DOCUMENTS

| | | | |
|---|---|---|---|
| 4,102,150 A | | 7/1978 | Kountz ........................ 62/209 |
| 4,667,480 A | | 5/1987 | Bessler ........................ 62/180 |
| 4,790,143 A | * | 12/1988 | Hanson ........................ 62/126 |
| 4,909,043 A | | 3/1990 | Masauji et al. ............... 62/158 |
| 5,099,654 A | | 3/1992 | Baruschke et al. ........... 62/180 |
| 5,251,453 A | * | 10/1993 | Stanke et al. ................. 62/126 |
| 5,301,514 A | * | 4/1994 | Bessler ...................... 62/129 X |
| 5,713,213 A | * | 2/1998 | Nobuta et al. ............. 62/129 X |
| 5,934,087 A | * | 8/1999 | Watanabe et al. ............. 62/126 |

* cited by examiner

*Primary Examiner*—Harry B. Tanner
(74) *Attorney, Agent, or Firm*—Liniak, Berenato, Longacre & White

(57) ABSTRACT

The temperature of an airflow cooled by an evaporator of a closed loop air-conditioning system, determined by means of a sensor, is compared with a theoretical value corresponding to the control current of an external-control, variable-displacement compressor, in order to detect a low level of refrigerant fluid in the system or any blocking of a compressor valve.

13 Claims, 1 Drawing Sheet

METHOD FOR CHECKING THE STATE OF A CLOSED LOOP AIR-CONDITIONING SYSTEM COMPRISING A VARIABLE-THROUGHPUT COMPRESSOR

FIELD OF THE INVENTION

The invention relates to the air conditioning of the passenger compartment of motor vehicles.

BACKGROUND OF THE INVENTION

For this function, recourse is usually made to a closed loop air-conditioning system having a loop of refrigerant fluid and including a compressor, a condenser, a pressure-reduction valve and an evaporator, the latter being in contact with an airflow to be cooled.

In early systems, the compressor was continuously driven by the engine of the vehicle so as to produce a throughput of refrigerant fluid determined by the speed of the engine. The airflow, greatly cooled by the evaporator, then passed through the radiator for heating the passenger compartment so as to be adjusted to the desired temperature.

The cooling of the air, followed by reheating, was hardly satisfactory in terms of energy economy. To remedy that, recourse was made to variable-displacement compressors, called internal-control compressors, the throughput of which could be set independently of their speed of rotation within the range of regulation of the displacement, by virtue of a valve the position of which was such that the entry pressure of the fluid was a function of the exit pressure. As the settings obtained were still not sufficiently fine externally controlled, variable-displacement compressors were developed. These compressors have a solenoid valve, preferably a chopper-type valve, the power-supply current of which determines the entry pressure of the fluid into the compressor. With this pressure being equal, to within a loss of pressure head, to that prevailing in the evaporator, which determines the operating temperature of the evaporator, it is thus possible to set the effectiveness of the air-conditioning loop with precision. An example of an external-control, variable-displacement compressor is described in EP-A-0 353 764.

In the event of leakage in the loop, the quantity of refrigerant fluid contained within the system will diminish. Below a refrigerant-fluid level threshold, the compressor risks being damaged in operation.

Moreover, it can happen that the control valve of the compressor becomes blocked and no longer allows the cooling power produced to be adjusted, whatever the power-supply current which is applied to it.

The object of the invention is to make it possible to detect operating anomalies in a closed loop air-conditioning system comprising a variable-throughput compressor, and especially insufficient refrigerant-fluid level or a blockage of the control valve of the compressor.

SUMMARY OF THE INVENTION

The invention envisages, in particular, a method for checking the state of a closed loop system for air conditioning the passenger compartment, of a motor vehicle, especially a system comprising an evaporator suitable for cooling an airflow to be sent into the passenger compartment, and a variable-throughput compressor controlled by an electrical control signal, in which method the temperature of the said airflow is determined by means of a sensor, a corresponding theoretical value of the said temperature is defined, for at least one value of the said control signal, the actual value of the temperature is compared with the theoretical value and the result of this comparison is used as an indicator of the normal or abnormal state of the loop.

The result of the comparison may especially indicate a low level of refrigerant fluid in the loop.

This is because, in normal operation, the major part of the volume of the evaporator is full of refrigerant fluid in liquid/gas equilibrium, the temperature of which is determined by the pressure at the entry to the compressor, as indicated above. If the quantity of refrigerant fluid in the closed loop system is insufficient, then the evaporator contains only a small quantity of fluid in the liquid state, or even none at all, and on the contrary is filled entirely, or almost entirely, with fluid in the superheated gaseous state, that is to say at a temperature higher than the liquid/gas equilibrium temperature. A temperature sensor in contact with the evaporator for detecting the temperature of the airflow, or in contact with the air immediately downstream thereof, placed facing an area of the evaporator where the fluid is normally in liquid/gas equilibrium, will then be facing a superheated area and will detect a temperature higher than the theoretical temperature.

In the case of an external-control variable-displacement compressor as set out above, blockage of the valve of the compressor may also be revealed by the result of the comparison.

The choice of the power-supply current for the valve then no longer has any effect on the pressure at the entry to the compressor and consequently on the temperature of the airflow, the latter being just as likely to be above as below the theoretical value.

Optional characteristics of the invention, which are complementary or alternative, are set out below:

any low level of the refrigerant fluid is indicated by the fact that the actual temperature of the airflow exceeds a predetermined threshold with respect to the theoretical temperature.

in order to check the level of refrigerant fluid, the comparison is carried out after having applied a control current for sufficient time to produce a high throughput of the fluid.

any blockage of the valve of the compressor is indicated by the fact that the actual temperature of the airflow remains constant when the control current, and consequently the theoretical temperature, is varied.

the compressor is driven electrically.

the theoretical value or the threshold is defined by using parameters, in combination with the control signal, which link the temperature of the airflow to the pressure at the entry to the compressor.

the parameters comprise at least one of the following parameters: state of a blower producing the said airflow, position of a flap for recycling the air of the passenger compartment, speed of the vehicle, temperature of the air outside and inside the passenger compartment, relative humidity and temperature of the incident airflow and throughput of refrigerant fluid in the loop.

The sensor may be placed in the vicinity either of the superheated area, or of the coldest point of the evaporator, or else at a point of the evaporator taken to an intermediate temperature.

BRIEF DESCRIPTION OF THE DRAWINGS

The characteristics and advantages of the invention will be set out in more detail in the description below, by referring to the attached drawings.

DETAILED DESCRIPTION OF THE INVENTION

The evaporator illustrated, designated by the reference 1, exhibits a front face, or entry face, 2 and a rear face, or exit face, 3, and is traversed, from the front face 2 to the rear face 3, by an airflow to be cooled represented by the arrow F. A temperature probe 4 is embedded in the evaporator or downstream thereof, in the vicinity of its rear face 3, so as to measure the temperature of the air cooled by the evaporator.

Figures 1, 2:
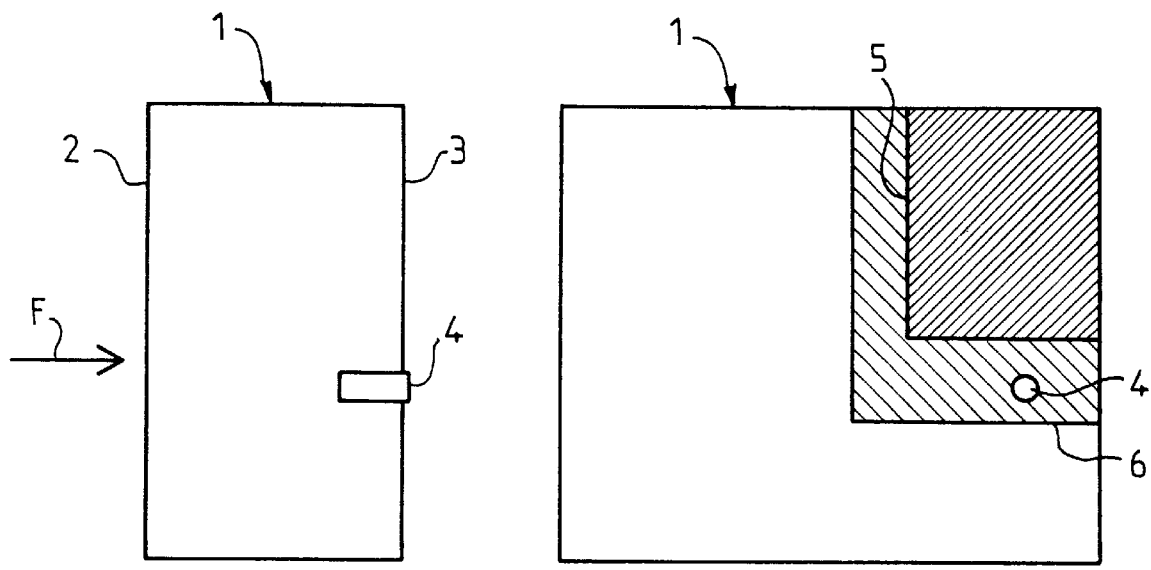
FIG. 1 is a diagrammatic side view of an evaporator of a vehicle air-conditioning system, equipped with an air-temperature probe with a view to implementing the method according to the invention.
FIG. 2 is a diagrammatic rear view of the evaporator.

FIG. 2 shows the evaporator seen on its rear face. A rectangle has been used to represent, diagrammatically, a region 5 of the evaporator, close to the outlet pipework, not represented, for the refrigerant fluid, in which the latter is superheated, after vaporization, when the air-conditioning system is operating normally. The probe 4 is situated outside this region and at a short distance from it. It is therefore been swept by the air that has traversed the remaining area of the evaporator, where the refrigerant fluid is in liquid/gas equilibrium. This air is at a temperature theoretically related to the pressure of the fluid at the entry to the compressor and consequently to the power-supply current of the control valve thereof, as set out above.

In the event of a deficiency of refrigerant fluid, the superheated fluid occupies a region 6 of the evaporator larger than the region 5 and encompassing the probe 4. The temperature measured by the probe is therefore higher than the theoretical temperature defined by the control current of the compressor.

Figure 3:
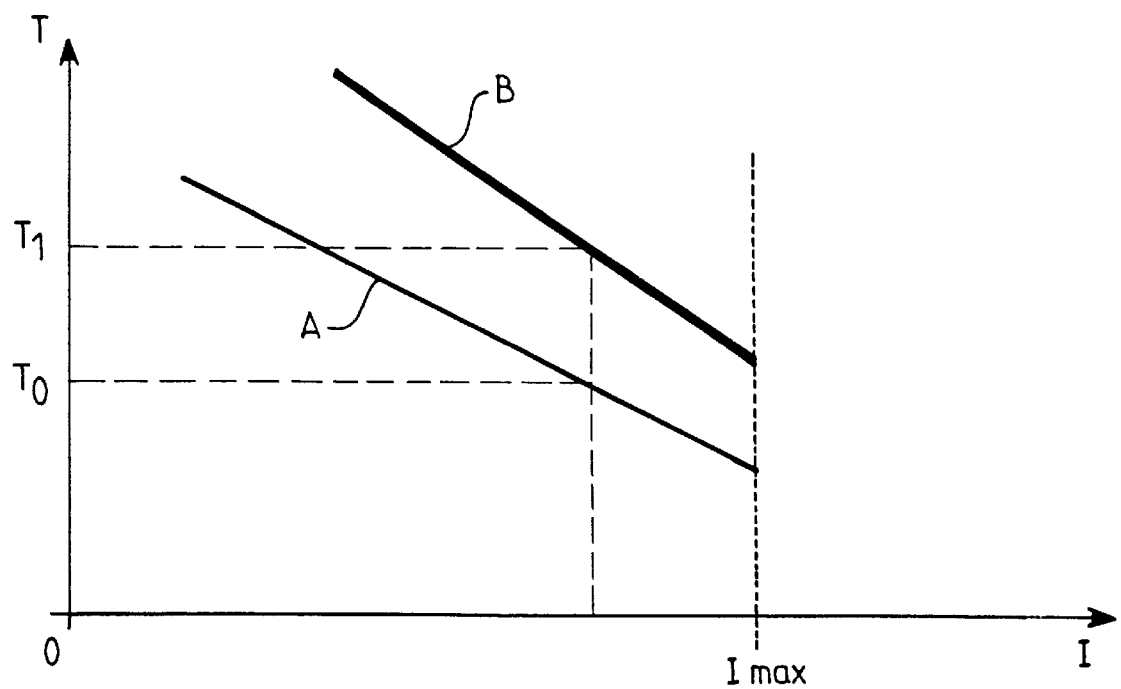
FIG. 3 is a graph showing the variation in the temperature of the airflow as a function of the power-supply current of the control valve of the compressor.

FIG. 3, at A, shows a typical curve representative of the variation in the theoretical temperature $T_0$ of the airflow having passed through the evaporator, as a function of the power-supply current I of the control valve of the compressor, which can vary between 0 and a maximum value Imax. FIG. 3 also shows a curve B that associates with each value of I a temperature value $T_1$, higher than the corresponding value of the theoretical temperature $T_0$. Such a value $T_1$, can be used as a threshold for detecting an insufficient fill level of refrigerant fluid in the air-conditioning loop.

In reality, it is the pressure of the fluid at the entry to the compressor which is determined directly by the current I, within the limits of the displacement of the compressor. As for the temperature of the airflow having passed through the evaporator, it is a function of the evaporation temperature in the evaporator and of various parameters such as the throughput of the airflow, its relative humidity and its temperature upstream of the evaporator, and the effectiveness of the evaporator. The throughput of the airflow may depend, in its turn, on the state of a fan that produces it, on the position of a flap for recycling the air from the passenger compartment and on the speed of the vehicle. Finally, as indicated above, the relationship between the evaporation temperature in the evaporator and the pressure of the refrigerant fluid at the entry to the compressor depends on the throughput of refrigerant fluid in the system. All these parameters, which are chosen in the context of the running of the air-conditioning installation, or which can be determined directly or indirectly by existing means, can be taken into account for calculating the theoretical temperature $T_0$, the curve A of FIG. 3 depending on the instantaneous value of these parameters. In a variant, a fixed curve A can be used, and the curve B can be chosen in such a way that the temperature $T_1$ is always significantly higher than the theoretical temperature, corrected by the application of the parameters, whatever the values thereof.

The checking of the level of refrigerant fluid is performed with the vehicle in operation and/or during maintenance operations, by carrying out the comparison of temperatures after a defined period, for example, between 2 and 3 minutes, of operation of the compressor at a relatively high displacement.

It will be noted that it is known how to arrange a temperature probe for the cooled air in the vicinity of the coldest point of the evaporator, which is generally close to the entry pipework for the refrigerant fluid. Such a probe is used for regulating the temperature of the airflow and/or for detecting a risk of the evaporator icing up. By adapting the level for detecting the icing of the probe 4 described above, it is then possible to use it for detecting the icing. Likewise, it can be used for regulating the temperature of the airflow. The known probe can be used to implement the present invention, the detection of the low level then being later since an abnormally high temperature is measured only when the evaporator contains practically no fluid in the liquid state. The probe used in the invention may also be arranged at any intermediate position.

What is claimed is:

1. A method for checking the state of a closed loop air conditioning system for air conditioning the passenger compartment of a motor vehicle, the system including an evaporator suitable for cooling an airflow to be sent into the passenger compartment, and a variable-throughput compressor controlled by an electrical control signal, in which method the temperature of the said airflow is determined by means of a sensor, a corresponding theoretical value of said temperature is defined, for at least one value of the said control signal, the actual value of the temperature is compared with the theoretical value and the result of this comparison is used as an indicator of the normal or abnormal state of the system.

2. A method according to claim 1, wherein the result of said comparison is used as an indicator of a low level of refrigerant fluid in the system.

3. A method according to claim 2, wherein a low level of the refrigerant fluid is indicated by the fact that the actual temperature of the airflow exceeds a predetermined threshold with respect to the theoretical temperature.

4. A method according to claim 2, wherein to check the level of refrigerant fluid, said comparison is carried out after having applied a control current for a sufficient time to produce a high throughput of said fluid.

5. A method according to claim 1, wherein the compressor is of the external-control, variable-displacement type, the said control signal being a control current supplying a valve incorporated in the compressor, the compressor being able to establish a pressure, at the entry thereto, which is determined by the said control current.

6. A method according to claim 5, wherein the result of said comparison is used as an indicator of any blockage of the valve of the compressor.

7. A method according to claim 6, wherein any blockage of the valve of the compressor is indicated by the fact that the actual temperature of the airflow remains constant when the said control current, and consequently the theoretical temperature, is varied.

8. A method according to claim 1, wherein the compressor is driven electrically.

9. A method according to claim 1, wherein said theoretical value or said threshold is defined by using parameters, in combination with said control signal, which link the temperature of the airflow to said pressure at the entry to the compressor.

10. A method according to claim 9, wherein the said parameters comprise at least one of the following parameters: state of a blower producing the said airflow, position of a flap for recycling the air of the passenger compartment, speed of the vehicle, temperature of the air outside and inside the passenger compartment, relative humidity and temperature of the incident airflow, throughput of refrigerant fluid in the loop.

11. A method according to claim 1, wherein said sensor is placed in the vicinity of a superheating area of the evaporator.

12. A method according to claim 1, wherein said sensor is placed in the vicinity of the coldest point of the evaporator.

13. A method according to claim 1, wherein said sensor is placed in the vicinity of a point of the evaporator at an intermediate temperature.

* * * * *